(12) United States Patent
Kuan et al.

(10) Patent No.: US 7,037,125 B1
(45) Date of Patent: May 2, 2006

(54) MEMORY CARD CONNECTOR

(75) Inventors: Chi-Te Kuan, Shulin (TW); Jia-shiu Wu, Shulin (TW)

(73) Assignee: L & K Precision Technology Co., Ltd., Taipei Hsien (TW)

( * ) Notice: Subject to any disclaimer, the term of this patent is extended or adjusted under 35 U.S.C. 154(b) by 0 days.

(21) Appl. No.: 11/130,170

(22) Filed: May 17, 2005

(51) Int. Cl.
*H01R 13/62* (2006.01)

(52) U.S. Cl. ..................... 439/159; 439/188

(58) Field of Classification Search ............... 439/159, 439/188, 489, 152–155, 630
See application file for complete search history.

(56) References Cited

U.S. PATENT DOCUMENTS

| | | | |
|---|---|---|---|
| 6,382,993 B1 * | 5/2002 | Chen | 439/157 |
| 6,488,528 B1 * | 12/2002 | Nishioka | 439/489 |
| 6,585,542 B1 * | 7/2003 | Nishio et al. | 439/630 |
| 6,619,991 B1 * | 9/2003 | Nishio et al. | 439/630 |
| 6,749,450 B1 * | 6/2004 | Chen | 439/188 |
| 6,843,670 B1 * | 1/2005 | Yamaguchi et al. | 439/159 |
| 6,846,192 B1 * | 1/2005 | Tien | 439/159 |
| 6,951,471 B1 * | 10/2005 | Chen | 439/159 |

* cited by examiner

*Primary Examiner*—Gary F. Paumen
*Assistant Examiner*—Phuongchi Nguyen
(74) *Attorney, Agent, or Firm*—Troxell Law Office, PLLC

(57) ABSTRACT

A memory card connector has an insulative frame, a plurality of conductive terminals received in the insulative frame, an ejecting device for guiding a memory card in or out, and a shell shielding the insulative frame. A normal-open type activation switch is mounted on the insulative frame and includes a first pin and a second pin identical and parallel to each other. The first pin and the second pin respectively have bases, contact arms, interferential arms and soldering arms. The contact arms bend perpendicularly from the bases and further bend inversely to form suspending branch arms. The branch arms respectively have arcuate portions at substantially middle thereof and free ends.

11 Claims, 6 Drawing Sheets

MEMORY CARD CONNECTOR

BACKGROUND OF THE INVENTION

1. Field of the Invention

The present invention relates to a memory card connector, and particularly to a memory card connector which has an activation switch and retains the inserted card thereon.

2. Related Art

With development of Information technology and digital technology, a variety of memory cards are designed according to different application. A Push-Push Type memory card connector of prior art, which allows a memory card being inserted or ejected by pressing the memory card, comprises an insulative frame having conductive terminals therein, an ejecting device assembled on the insulative frame for guiding a memory card in or out, and a shell enveloping the insulative frame. Such a memory card connector has small size and short card insertion distance, and therefore it is uneasy to determine positioning of the card. To overcome this defect, the memory card connector also provides an activation switch which activates signal transmission when the memory card is inserted to a desired position and triggers it.

However, regardless of normal-close type or normal-open type activation switch, it always consists of two or three different types components. Manufacture and assembly process is complicated, needing relatively high cost.

Additionally, the memory card connector guides the memory card insertion or ejection, but cannot retain the memory card when it is in a predetermined position. Once the memory card is impacted or extracted contrary to insertion direction by external force, or is used under improper environment, it may displace, or even cannot exactly contact the conductive terminals of the memory card connector. This tends to make unstable signal transmission or even abrade the conductive terminals.

SUMMARY OF THE INVENTION

Accordingly, an object of the present invention is to provide a memory card connector which simplifies manufacture and assembly process and which retains a memory card when it is at a predetermined position thereby costing down and assuring reliable signal transmission.

The card connector comprises an insulative frame, a plurality of conductive terminals received in the insulative frame, an ejecting device for guiding a memory card in or out, a shell shielding the insulative frame, and an activation switch. The activation switch is normal-open type and includes a first pin and a second pin identical and parallel to each other. The first pin and the second pin respectively have bases, contact arms, interferential arms and soldering arms. The contact arms bend perpendicularly from the bases and further bend inversely to form suspending branch arms. The branch arms respectively have arcuate portions at substantially middle thereof, and free ends. When the memory card biases the branch arm of the first pin, the free end of the first pin contacts the arcuate portion of the second pin, thereby electrically communicating the first pin and the second pin.

DESCRIPTION OF THE PREFERRED EMBODIMENTS

Figure 1:
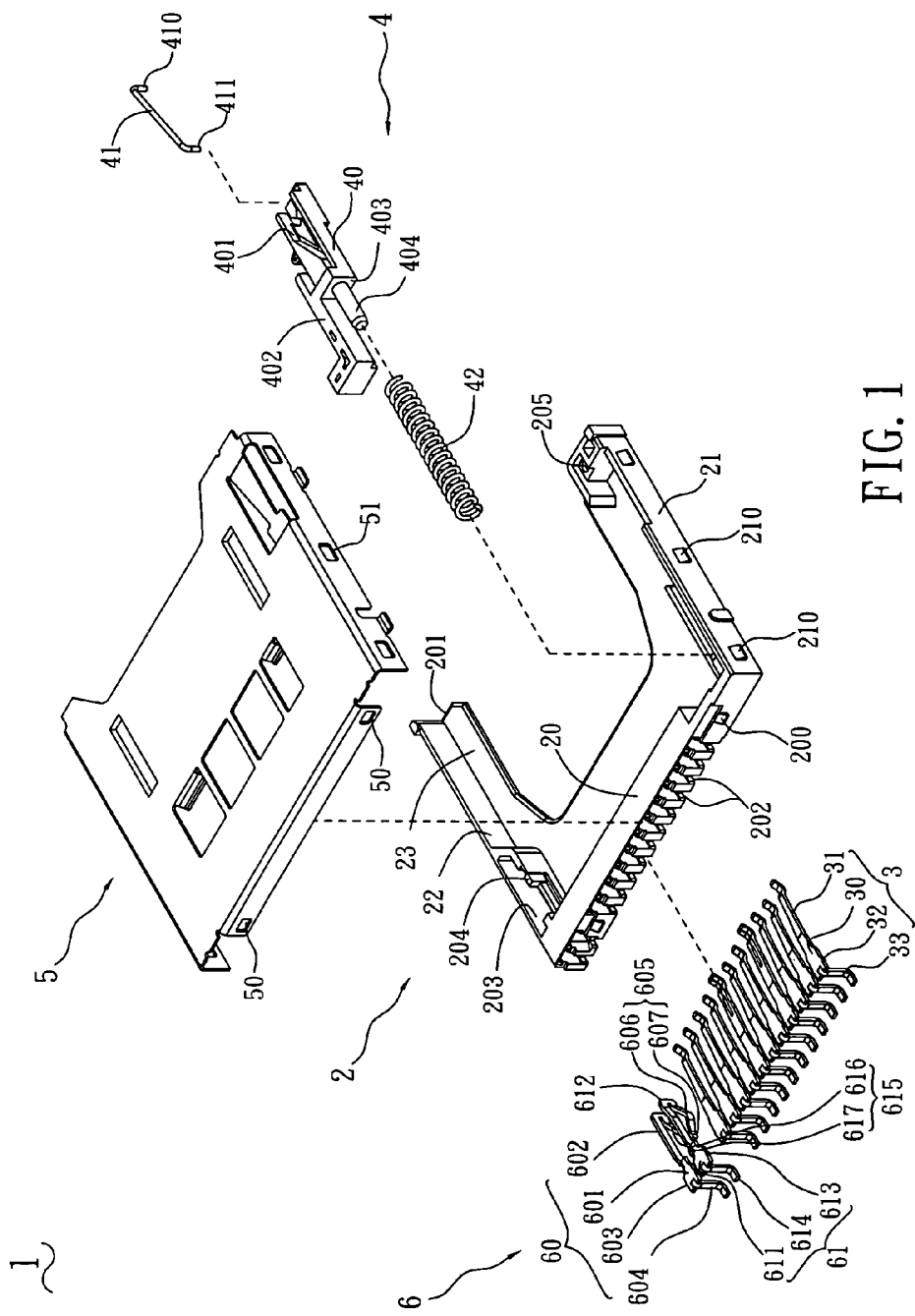
FIG. 1 is an exploded view of a memory card connector of the present invention.
Figure 2:
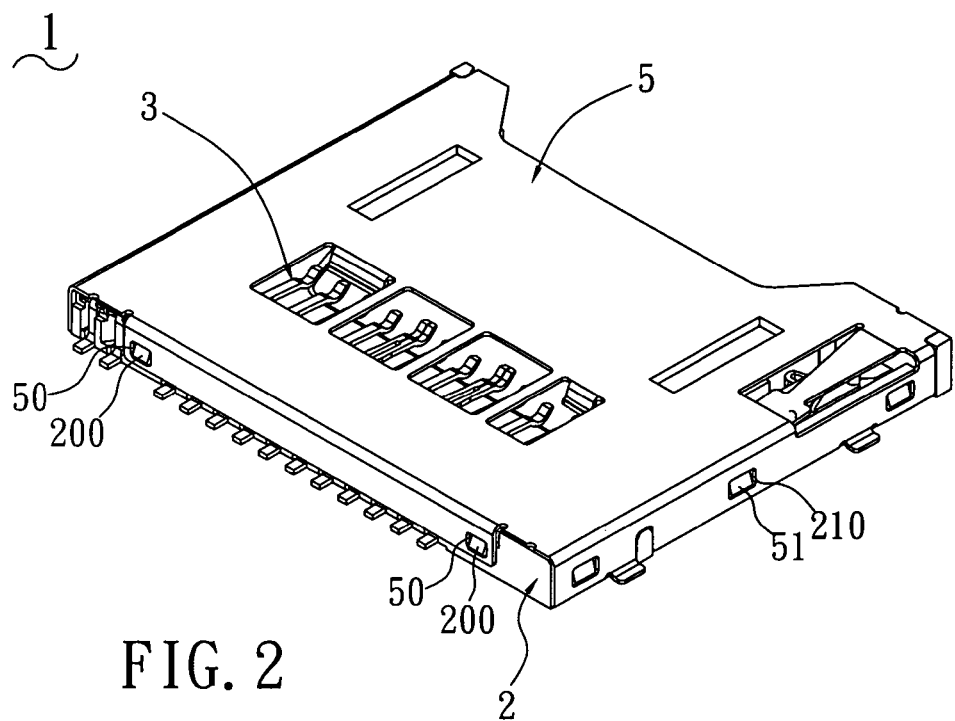
FIG. 2 is an assembled view of the memory card connector of FIG. 1.
Figure 3:
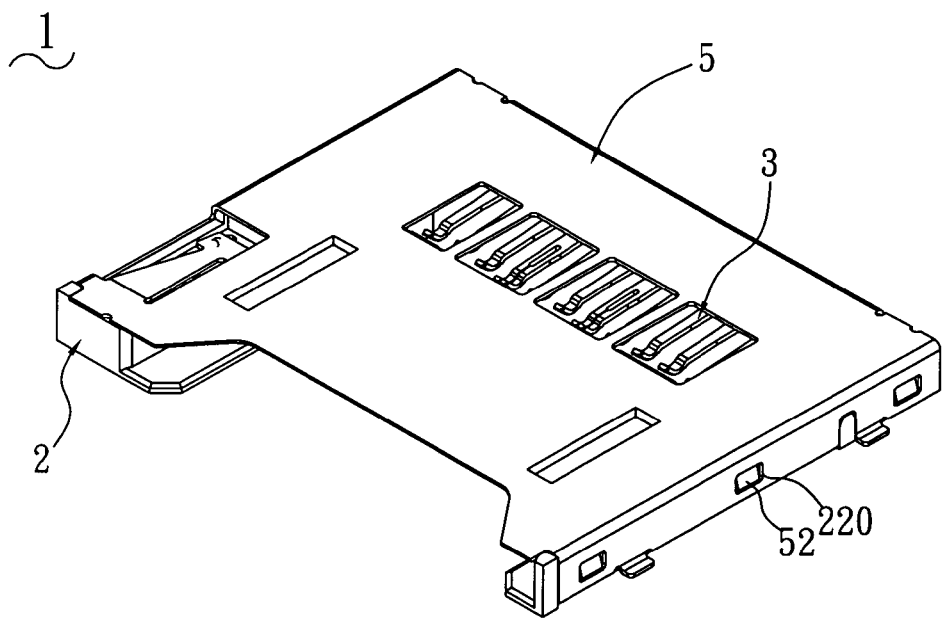
FIG. 3 is an assembled view of the memory card connector from another aspect.

With reference to FIGS. 1 and 2, a memory card connector 1 of the present invention comprises an insulative frame 2, a plurality of conductive terminals 3 received in the insulative frame 2, an ejecting device 4, a shell 5 and an activation switch 6. The insulative frame 2 has a housing 20, a first side wall 21 and a second side wall 22 respectively extending from opposite ends of the housing 20, and a bottom wall 23 extending from a bottom edge of the housing 20. The housing 20, the first and the second side walls 21, 22 and the bottom wall 23 define a slot 201 for receiving a memory card therein. The housing defines a plurality of passageways 202 for receiving the conductive terminals 3. Combining FIGS. 1, 2 and 3, tabs 200, 210, 220 are respectively formed on the housing 20 and the first and the second side walls 21, 22 for locking the shell 5. An assembling block 203 is formed on the second side wall 22 and adjacent the passageways 202 for accommodating a first pin 60 and a second pin 61 of the activation switch 6. A stop wall 204 is formed in the assembling block 203 for controlling lower stress of the first pin 60 and the second pin 61. An axis base 205 is formed on an end of the first side wall 21.

Each conductive terminal 3 includes a body 30, a contact end 31 extending from an end of the body 30, an interferential portion 32 and a soldering end 33 opposite the contact end 31. The interferential portion 32 has barbs depending from opposite sides of the body 30 for interferentially fitting to an inner wall of a passageway 202. The soldering end 33 extends and bends from the body 30 for surface mounting.

The ejecting device 4 is mounted on the first side wall 21 of the insulative frame 2, and includes a sliding base 40 and a guiding pole 41. The sliding base 40 defines a heart-like guiding groove 401 therein. An L-shaped link arm 402 is formed at a side of the sliding base 40 and near the guiding groove 401, and offsets relative to the sliding base 40. A shoulder 403 is formed between the sliding base 40 and the link arm 402. A positioning post 404 is formed on the shoulder 403. The guiding pole 41 has a pivoting end 410 pivoting to the axis base 205 of the first side wall 21, and a moving end 411 opposite the pivoting end 410 for moving along the guiding groove 401. A resilient element 42, for example a compressed spring, is mounted around the positioning post 404 for providing returning force for the sliding base 40.

Figure 6:
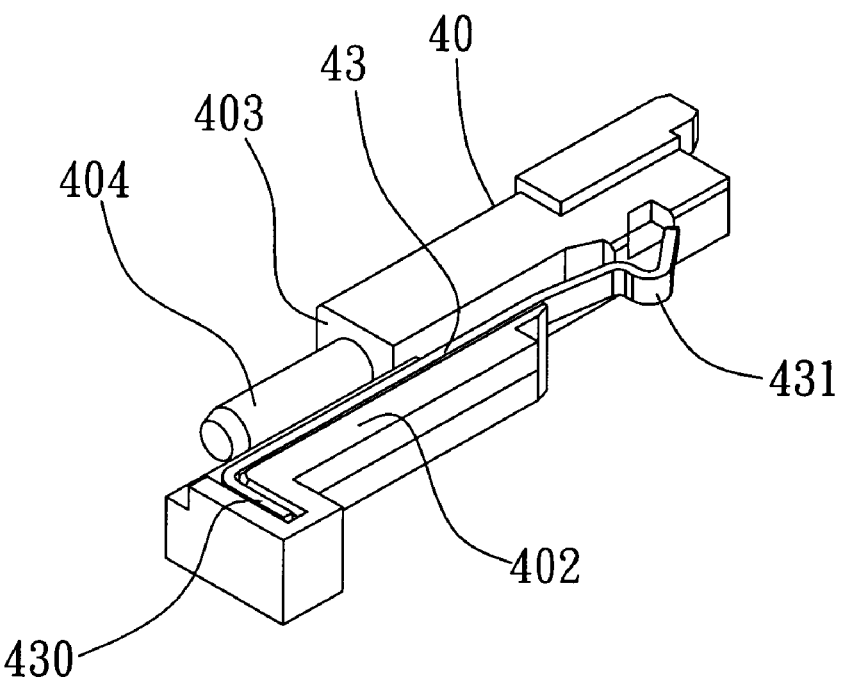
FIG. 6 shows a latch lever assembled on a link arm.
Figure 7:
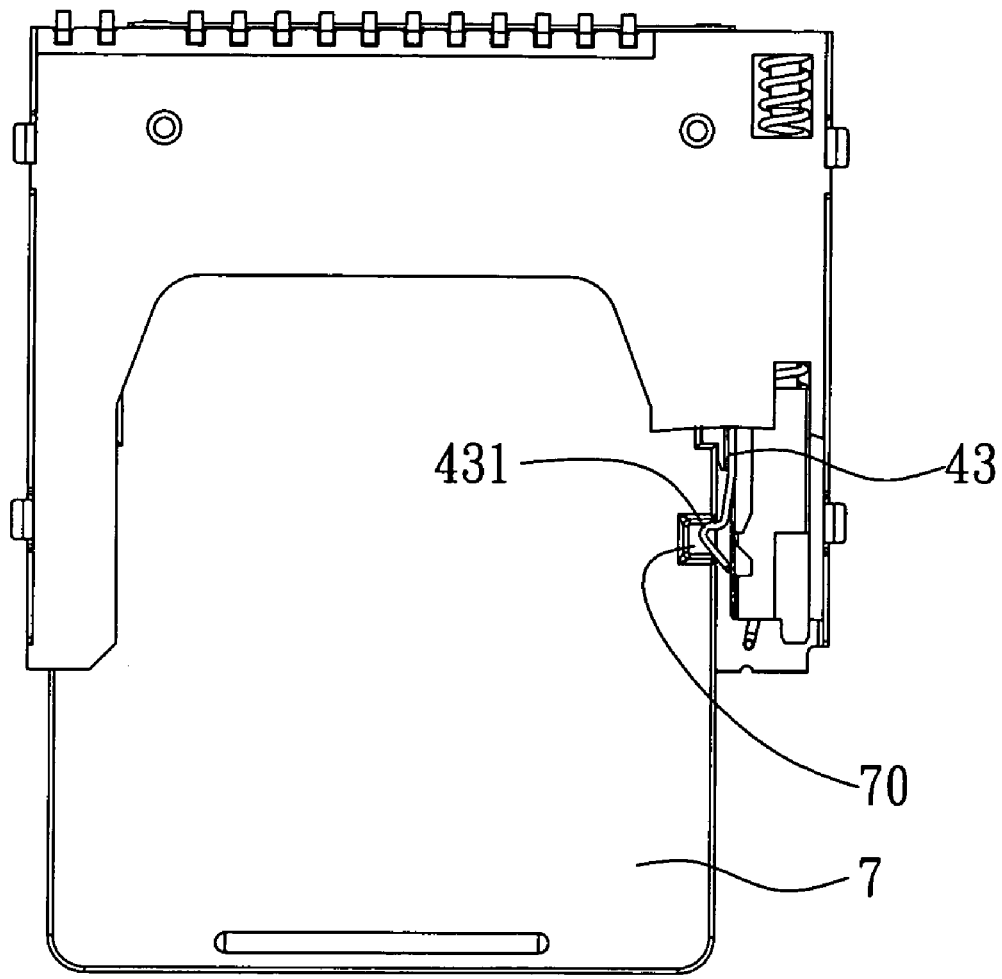
FIG. 7 shows a memory card inserted in the memory card connector.

Referring to FIG. 6, a latch lever 43 is suspended from an inner edge of the link arm 402, and forms a connecting end 430 for mounting on the link arm 402 and an arcuate locking end 431 suspending beyond the link arm 402. Further referring to FIG. 7, when the memory card 7 is inserted to a predetermined position, the locking end 431 of the latch lever 43 abuts against a locking groove 70 of the memory card 7, thereby preventing the memory card 7 from displacing or disengaging when it is impacted or extracted by external force contrary to insertion direction or when it works under improper environment.

The shell 5 is mounted on the insulative frame 2 and shields the housing 20, the first and the second side walls 21, 22 and the bottom wall 23. Locking holes 50, 51, 52 are defined in the shell 5 for respectively locking with the tabs 200, 210, 220 of the insulative frame 2, thereby fixing the shell 5 on the insulative frame 2.

Figure 4:
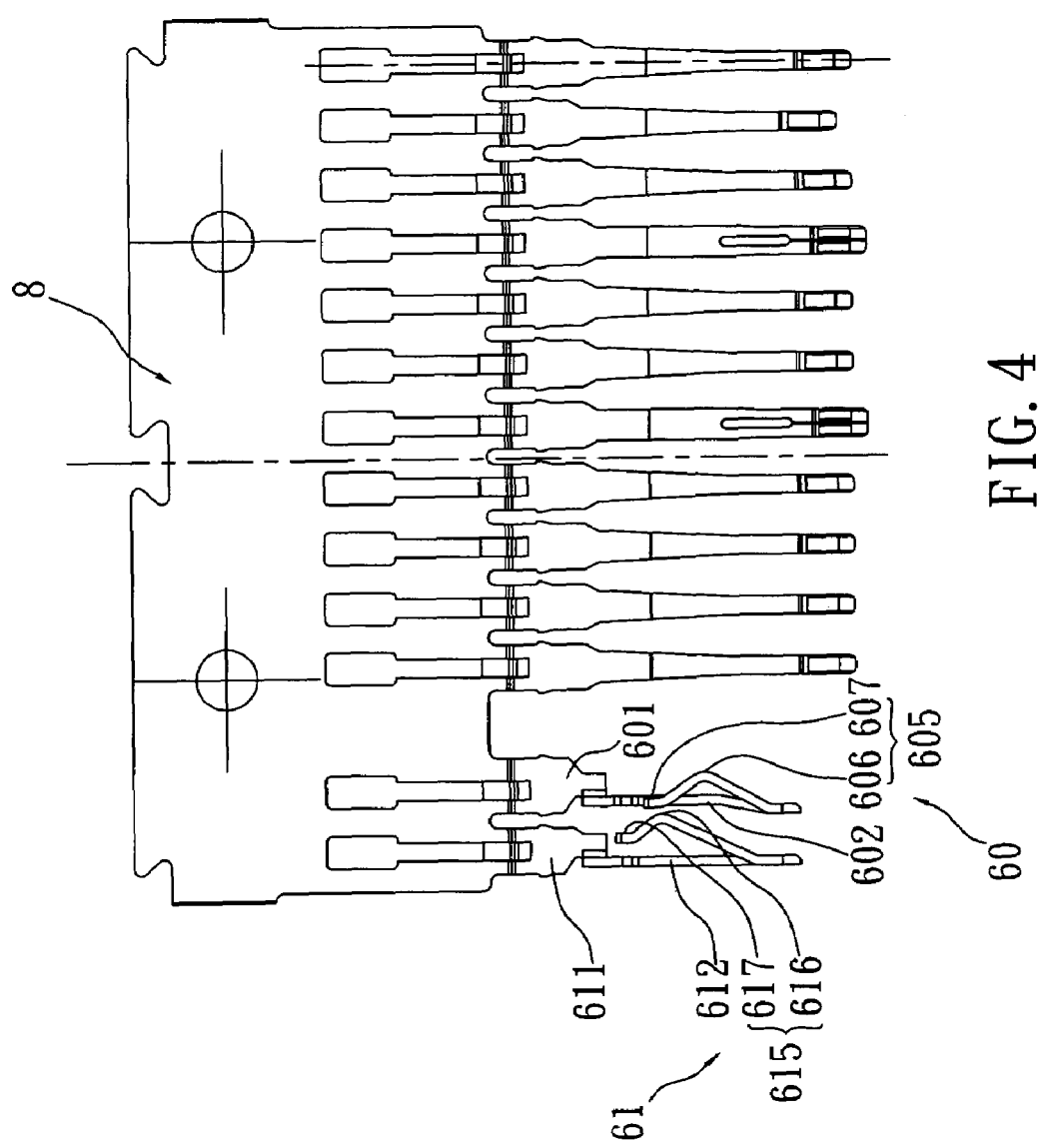
FIG. 4 is a plane view of conductive terminals and an activation switch of the present invention on a strip.
Figure 5:
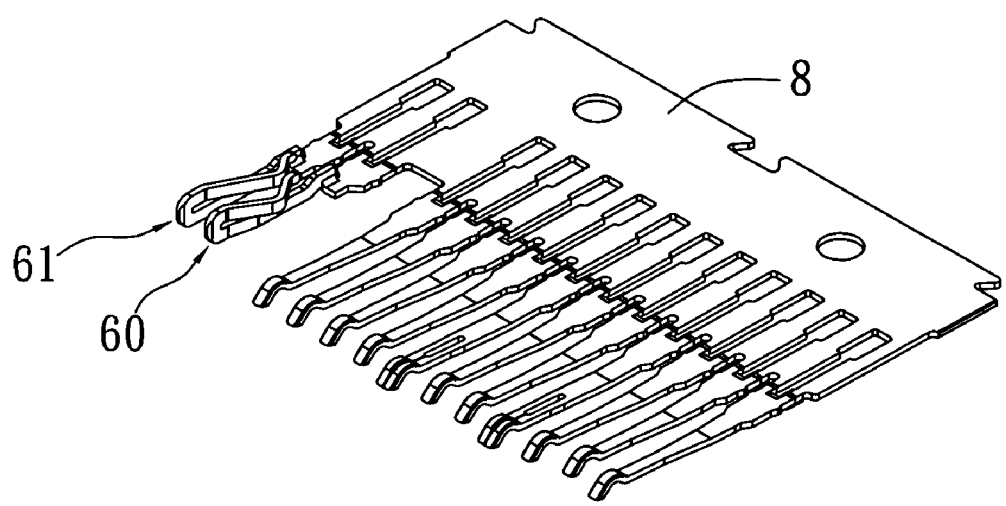
FIG. 5 is a perspective view of conductive terminals and an activation switch of the present invention on a strip.
Figure 9:
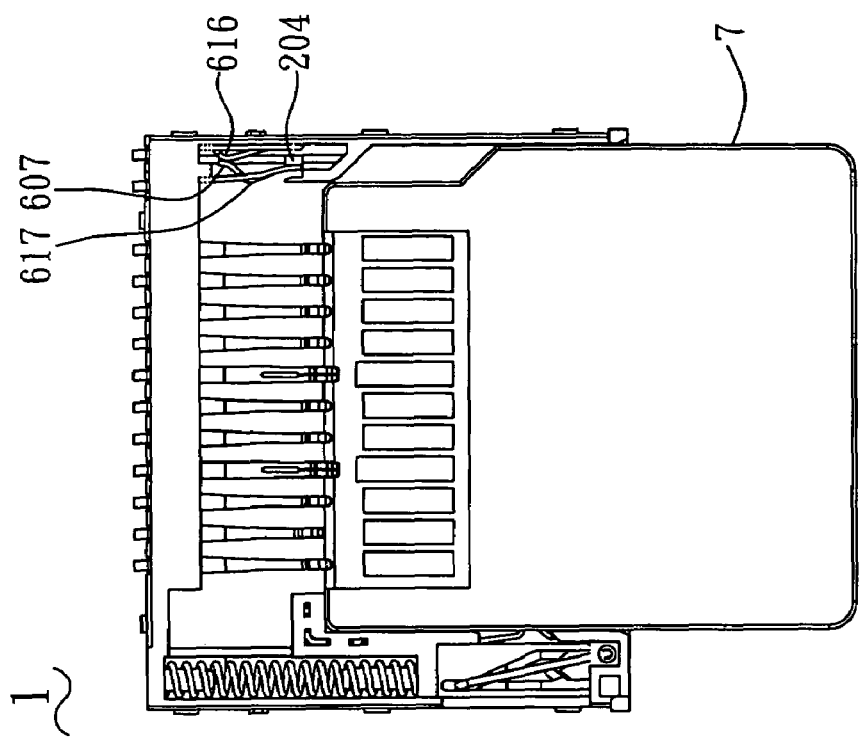
FIG. 9 shows the first pin and the second pin of the activation switch contacting the memory card inserted into the memory card connector.
Figure 8:
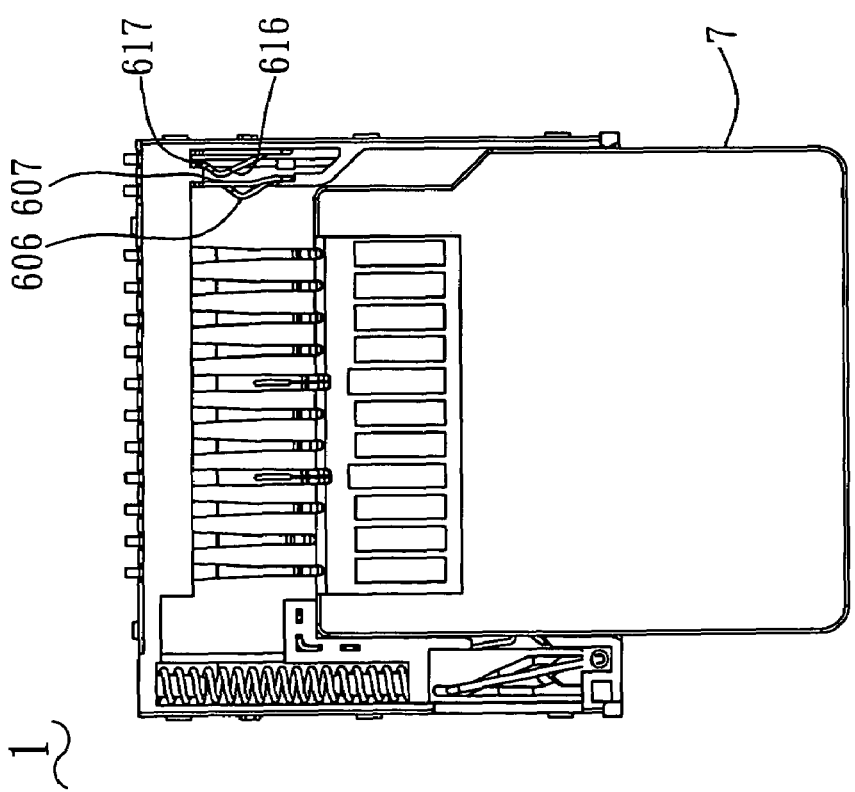
FIG. 8 shows the activation switch of the present invention in normal state, wherein a first pin and a second pin thereof are apart from each other.

As shown in FIG. 1, the activation switch 6 is assembled on the assembling block 203 and is normal-open type. The activation switch 6 has a first pin 60 and a second pin 61 identical and parallel to each other. The first pin 60 and the second pin 60 respectively include bases 601, 611, contact arms 602, 612, interferential arms 603, 613 and soldering arms 604, 614. The interferential arms 603, 613 and the soldering arms 604, 614 are respectively of the same structures as the interferential portions 32 and the soldering ends 33 of the conductive terminals 3. Namely, the interferential arms 603, 613 and the interferential portions 32 are respectively constructed as barbs on opposite sides of the bases 601, 611 and the body 30; while the soldering arms 604, 614 and the soldering ends 33 are respectively constructed for surface mounting. In combination with FIGS. 4 and 5, during manufacturing, the first pin 60, the second pin 61 and the conductive terminals 3 are stamped and bent in a common strip 8. The contact arms 602, 612 of the first pin 60 and the second pin 61 bend perpendicularly from the bases 601, 611, as shown in FIG. 4, and further bend inversely to form suspending branch arms 605, 615. The branch arms 605, 615 respectively have arcuate portions 606, 616 at substantially middle thereof, and free ends 607, 617. When the memory card 7 biases the branch arm 605 of the first pin 60, the free end 607 of the branch arm 605 contacts the arcuate portion 616 of the second pin 61, thereby electrically communicating the first pin 60 and the second pin 61. As shown in FIG. 8, when the memory card 7 is not at the predetermined position, the first pin 60 and the second pin 61 are apart from each other since the activation switch 6 is normal-open type. As shown in FIG. 9, when the memory card 7 is exactly at the predetermined position, the free end 607 of the first pin 60 contact the arcuate portion 616 of the second pin 61, whereby the first pin 60 and the second pin 61 electrically communicate with each other.

It is understood that the invention may be embodied in other forms without departing from the spirit thereof. Thus, the present examples and embodiments are to be considered in all respects as illustrative and not restrictive, and the invention is not to be limited to the details given herein.

The invention claimed is:

1. A memory card connector, adapted for transferring signal between a memory card and a circuit board and being constructed as Push-Push type, comprising:
   an insulative frame having a housing, a first side wall, a second side wall and a bottom wall, which together defining a slot for receiving the memory card, the housing defining a plurality of passageways therein, an assembling block being formed adjacent the passageways;
   a plurality of conductive terminals received in the passageways, and each conductive terminal including a body, a contact end extending from an end of the body, an interferential portion and a soldering end opposite the contact end;
   an ejecting device mounted on the first side of the insulative frame, and including:
      a sliding base defining a guiding groove for guiding the memory card in or out, a link arm being formed on a side of the sliding base;
      a guiding pole having a pivoting end pivoting to the first side wall, and a moving end opposite the pivoting end for moving along the guiding groove; and
      a resilient element for providing returning force for the sliding base;
   a shell fixing on the insulative frame and at least shielding the housing, the first side wall and the second side wall; and
   an activation switch assembled on the assembling block of the insulative frame, being normal-open type and including a first pin and a second pin identical and parallel to each other, the first pin and the second pin respectively having bases, contact arms, interferential arms and soldering arms, the contact arms bending perpendicularly from the bases and further bending inversely to form suspending branch arms, the branch arms respectively having arcuate portions at substantially middle thereof and free ends, when the memory card biases the branch arm of the first pin, the free end of the first pin contacting the arcuate portion of the second pin thereby electrically communicating the first pin and the second pin.

2. The memory card connector as claimed in claim 1, wherein a stop wall is formed in the assembling block for controlling lower stress of the first pin and the second pin.

3. The memory card connector as claimed in claim 1, wherein the guiding groove of the sliding base is heart-like.

4. The memory card connector as claimed in claim 1, wherein an axis base is formed on an end of the first side wall for corresponding to the pivoting end of the guiding pole.

5. The memory card connector as claimed in claim 4, wherein tabs are respectively formed on the housing, the first side wall and the second side wall, and wherein locking holes are defined in the shell for respectively locking with the tabs, thereby fixing the shell on the insulative frame.

6. The memory card connector as claimed in claim 1, further comprising a latch lever having a connecting end mounting on the link arm, and a locking end suspending beyond the link arm.

7. The memory card connector as claimed in claim 6, wherein the link arm is L-shaped and offsets relative to the sliding base, and wherein a shoulder is formed between the sliding base and the link arm.

8. The memory card connector as claimed in claim 7, wherein the resilient element is a compressed spring and is mounted on the shoulder.

9. The memory card connector as claimed in claim 8, wherein the shoulder forms a positioning post, and wherein the compressed spring is mounted around the positioning post.

10. The memory card connector as claimed in claim 9, wherein the latch lever is suspended from an inner edge of the link arm, and wherein the locking end is arcuate and abuts against a locking groove of the memory card when the memory card is inserted to a predetermined position.

11. The memory card connector as claimed in claim 10, wherein the interferential arms and the soldering arms of the first pin and the second pin respectively have the same structures as the interferential portions and the soldering end of the conductive terminal, namely, the interferential arms and the interferential portion are constructed as barbs on opposite sides of the bases and the body; while the soldering arms and the soldering end are constructed for surface mounting.

* * * * *